United States Patent
Cheng et al.

(10) Patent No.: US 11,644,881 B2
(45) Date of Patent: May 9, 2023

(54) REALLOCATION OF POWER BETWEEN ELECTRONIC COMPONENTS

(71) Applicant: Hewlett-Packard Development Company, L.P., Spring, TX (US)

(72) Inventors: Chao Wen Cheng, Taipei (TW); Po Ying Chih, Taipei (TW); Yen Tang Chang, Taipei (TW)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/416,075

(22) PCT Filed: Jul. 31, 2019

(86) PCT No.: PCT/US2019/044559
§ 371 (c)(1),
(2) Date: Jun. 18, 2021

(87) PCT Pub. No.: WO2021/021205
PCT Pub. Date: Feb. 4, 2021

(65) Prior Publication Data
US 2022/0147129 A1     May 12, 2022

(51) Int. Cl.
*G06F 1/26*    (2006.01)
*G06F 1/3206*    (2019.01)
(Continued)

(52) U.S. Cl.
CPC ............ *G06F 1/266* (2013.01); *G06F 1/3206* (2013.01); *G06F 1/26* (2013.01); *G06F 1/3215* (2013.01);
(Continued)

(58) Field of Classification Search
CPC .......... G06F 1/26; G06F 1/266; G06F 1/3215; G06F 9/5094; G06F 1/3268; G06F 1/3253; G06F 1/3206
(Continued)

(56) References Cited

U.S. PATENT DOCUMENTS

| | | | |
|---|---|---|---|
| 6,222,347 B1 * | 4/2001 | Gong .................. | G06F 1/263 320/164 |
| 7,024,567 B2 * | 4/2006 | Kim .................. | G06F 1/266 713/340 |

(Continued)

FOREIGN PATENT DOCUMENTS

WO   WO-2014049801 A1   4/2014

OTHER PUBLICATIONS

Advanced power management helps bring improved performance to highly integrated x86 processors, 2014, ADM Embedded Solutions, 9 pages.

*Primary Examiner* — Ji H Bae
(74) *Attorney, Agent, or Firm* — Knobbe, Martens, Olson & Bear, LLP

(57) ABSTRACT

Techniques for reallocating power between a plurality of electronic components and a connection port of a computing system are described. In operation, operational state of an electronic component from amongst multiple electronic components is analysed. Based on the operational state of the electronic component, an unused power available with the electronic components is determined. Based on the availability of the unused power, a default power level associated with the connection port is increased, where the default power level is a predefined power allocated to the connection port for operation.

13 Claims, 4 Drawing Sheets

(51) Int. Cl.
*G06F 1/3215* (2019.01)
*G06F 1/3234* (2019.01)
*G06F 9/50* (2006.01)

(52) U.S. Cl.
CPC .......... *G06F 1/3253* (2013.01); *G06F 1/3268* (2013.01); *G06F 9/5094* (2013.01)

(58) Field of Classification Search
USPC .......................................... 713/300; 710/100
See application file for complete search history.

(56) References Cited

U.S. PATENT DOCUMENTS

| | | | |
|---|---|---|---|
| 7,831,843 B2* | 11/2010 | Brundridge | G06F 1/324 |
| | | | 307/29 |
| 8,719,601 B2 | 5/2014 | Chang et al. | |
| 8,904,217 B2 | 12/2014 | Harris | |
| 9,529,398 B2 | 12/2016 | Urbina et al. | |
| 2007/0245161 A1 | 10/2007 | Shaw et al. | |
| 2008/0178019 A1 | 7/2008 | McGrane et al. | |
| 2008/0263373 A1* | 10/2008 | Meier | G06F 9/3891 |
| | | | 713/300 |
| 2014/0143557 A1* | 5/2014 | Kuesel | H04L 12/10 |
| | | | 713/300 |
| 2015/0160674 A1 | 6/2015 | Burdette et al. | |
| 2016/0011914 A1 | 1/2016 | Bohn et al. | |
| 2018/0120910 A1 | 5/2018 | Farkas et al. | |
| 2018/0356873 A1 | 12/2018 | Regupathy et al. | |
| 2019/0138072 A1* | 5/2019 | Kuroi | G06F 1/266 |
| 2019/0278495 A1* | 9/2019 | Klein | G06F 3/0634 |

\* cited by examiner

REALLOCATION OF POWER BETWEEN ELECTRONIC COMPONENTS

BACKGROUND

In computing systems, multiple power modes are provided to optimize the power consumption in performing a variety of tasks. The power modes may include a low power mode and an active power mode. When the computing system is idle and is not running any application, the computing system may be transitioned into the low power mode to save power. On the other hand, when the computing system is running a processor intensive application, the computing system may be transitioned into the active power mode for optimization of performance.

DETAILED DESCRIPTION

Figure 1:
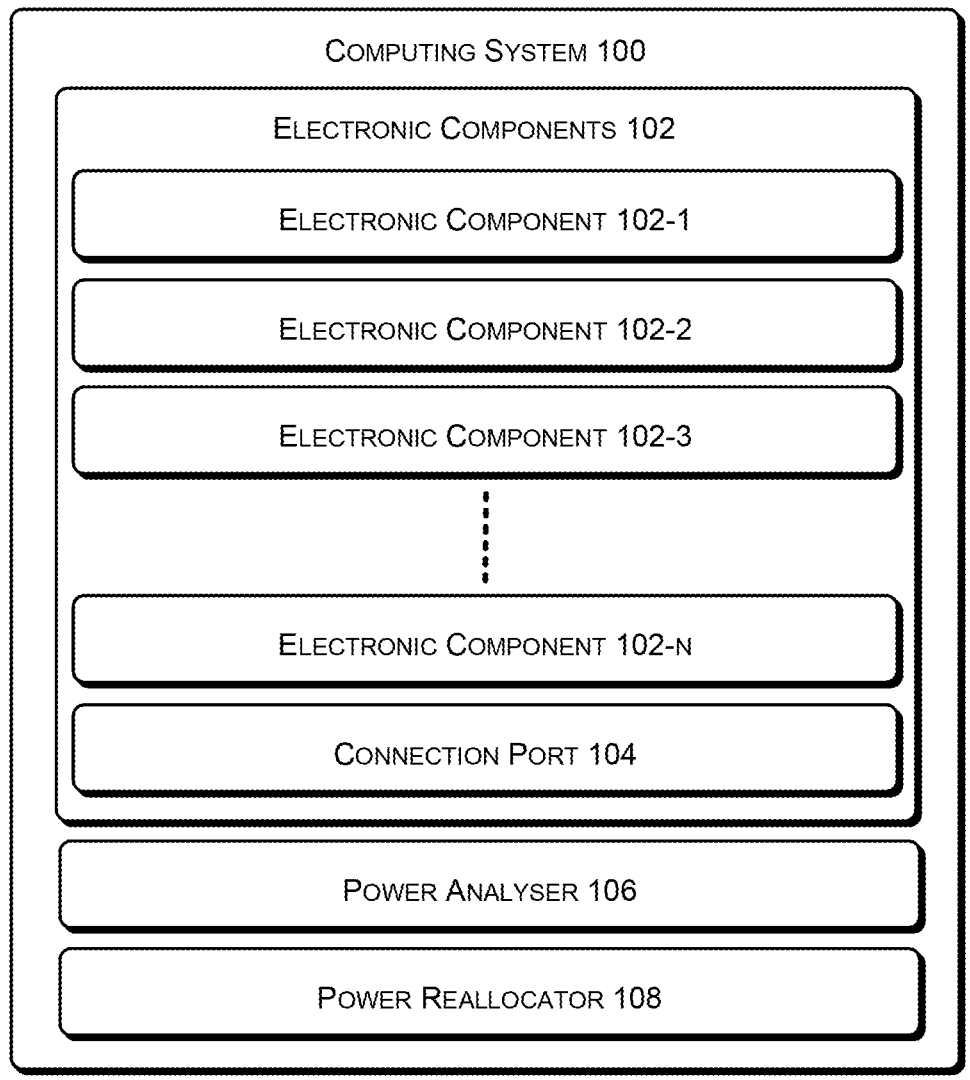
FIG. 1 illustrates a computing system, in accordance with an example of the present subject matter.

In computing systems, power management is achieved by allocating a predefined amount of power to various electronic components of the computing system for their operation. For instance, in a computing system, such as a laptop having more than one hard disk drive (HDD), a predefined amount of power is allocated to each HDD for their operation.

There may be situations where either one or more HDDs out of the total HDDs are not in use, or some slots of the HDDs are not filled and are idle. In such situations, the power allocated to the HDD slots may be wasted and is not used. Similarly, there may exist various other electronic components, such as processors for which a predefined amount of power may be allocated but may not always be used. The unused power, allocated to the electronic components, leads to inefficiency in usage of total power available with the computing system.

According to example implementations of the present subject matter, techniques of reallocating power between a plurality of electronic components and a connection port of a computing system are described.

In an example, there may be multiple electronic components included in a computing system. In operation, an operational state of such electronic components is determined. The operational state of an electronic component may indicate if the electronic component is working, idle, or not operational, and may correspondingly indicate the power consumed by the electronic component. Based on the operational state of the electronic component and the power used, unused power available with the electronic components is determined, where the unused power is a difference between a power allocated to the electronic component and a power consumed by the electronic component in operation. The unused power is then reallocated to a connection port of the computing system.

In an example implementation of the present subject matter, the reallocation of unused power to the connection port increases a default power level associated with the connection port, where the default power level is the power allocated to the connection port for operation. It would be noted that the default power allocated to the connection port may be based on different factors, such as indented power consumption of the connection port.

In an example, the default power level associated with the connection port is increased in a way such that the default power level does not violate a threshold power level of the computing system. The threshold power level is a maximum configured power for the connection port for safe operation of the connection port. In an example, the threshold power level may be configured as a thermal design power (TDP) of the computing system, where the TDP is a maximum heat generated by an electronic component that can be dissipated by the computing system.

An increase in the default power level associated with the connection port increases the total power being delivered from the connection port. This, in turn, increases a charging speed of a device being charged from the connection port.

The above techniques are further described with reference to FIG. 1 to FIG. 4. It should be noted that the description and the figures merely illustrate the principles of the present subject matter along with examples described herein and should not be construed as a limitation to the present subject matter. It is, thus understood that various arrangements may be devised that although not explicitly described or shown herein, embody the principles of the present subject matter. Moreover, all statements herein reciting principles, aspects, and implementations of the present subject matter, as well as specific examples thereof, are intended to encompass equivalents thereof.

FIG. 1 illustrates a computing system 100, in accordance with an example implementation of the present subject matter. Examples of computing system 100 may include, but not limited to, laptops, desktops, tablets, smartphones, and personal digital assistants (PDA).

The computing system 100 comprises multiple electronic components 102. The electronic components 102 includes an electronic component 102-1, electronic component 102-2, electronic component 102-3, . . . , electronic component 102-n, and a connection port 104. For the ease of reference, the electronic component 102-1, electronic component 102-3, . . . , electronic component 102-n, other than the connection port 104, have been referred to as electronic component 102, hereinafter.

In an example, the connection port 104 may be a Universal Serial Bus (USB) port. Further, the electronic component 102 may be any of a constituent of the computing system 100 incorporated to implement a functionality of the computing system 100. The electronic component 102 may be a storage device for example, a dynamic random access memory (DRAM) device, static random-access memory (SRAM) device or a double data rate synchronous dynamic random-access memory (DDRDRAM) device or a secondary storage device, for example, a programmable read-only memory (PROM) device, an erasable programmable read-only memory (EPROM) device or an electrically erasable programmable read-only memory (EEPROM) device.

Further, the electronic component 102 may also be a processing device, such as a signal processor or a graphics processor of the computing system 100. Further, the electronic component 102 may also include an interface device that allows external devices to be coupled to the computing system 100. Examples of such electronic component 102 include, but are not limited to, a universal serial bus (USB) port, a video graphics array (VGA) port, or a high-definition multimedia interface (HDMI) port.

The computing system 100 further includes a power analyser 106 and the power reallocator 108 coupled to the power analyser 106. In an example, the power analyser 106 and the power allocator 108 may be coupled to the electronic components 102 via a system bus (not shown) of the computing system 100.

In an example of the present subject matter, the electronic component 102 may be allocated a predefined amount of power for operation. The predefined power allocated to the electronic component 102 may be referred to as default power associated with the electronic component 102. It would be noted that depending upon the intended use of the electronic component 102, a default power may be allocated to the electronic component 102, and such allocation of default power may either be determined during bootup of the computing system 100, or during operation of the computing system 100.

In an example, the power analyser 106 may determine the default power allocated to the electronic component 102. The power analyser 106 may also determine a power consumed by the electronic component 102 during operation. Based on the default power allocated to the electronic component 102 and the power consumed by the electronic component 102, the power analyser 106 may identify unused power available with the electronic component 102. That is, the unused power of the electronic component is a difference between the power allocated to the electronic component 102 and the power consumed by the electronic component 102.

Thereafter, in an example implementation of the present subject matter, the power reallocator 108 may reallocate the unused power available with the electronic component 102 to the connection port 104.

In an illustrative example, the power allocator 108 may determine the default power associated with a graphic processor unit (GPU) during bootup of the computing system 100. In such example, the power analyser 106 may identify that the default power allocated to the GPU to be 130 watts and power consumed by the GPU to be 110 watts. Thus, the power allocator 108 may identify the unused power available with the GPU to be 20 watts and may allocate a part of the unused power available with the GPU to the connection port 104.

The reallocation of the unused power from the electronic component 102 to the connection port 104 increases a default power level associated with the connection port 104. As described earlier, the default power level associated with the connection port 104 is a predefined power allocated to the connection port 104 for operation. That is, the reallocation of the unused power to the connection port 104 increases the total power available at the connection port 104. This, in turn, increases the magnitude of a current being supplied by the connection port 104, and as a result, charging speed of a device being charged from the connection port may be increased. A detailed explanation related to the implementation of the above-mentioned techniques is further described with respect to explanation of forthcoming figures.

Figure 2:
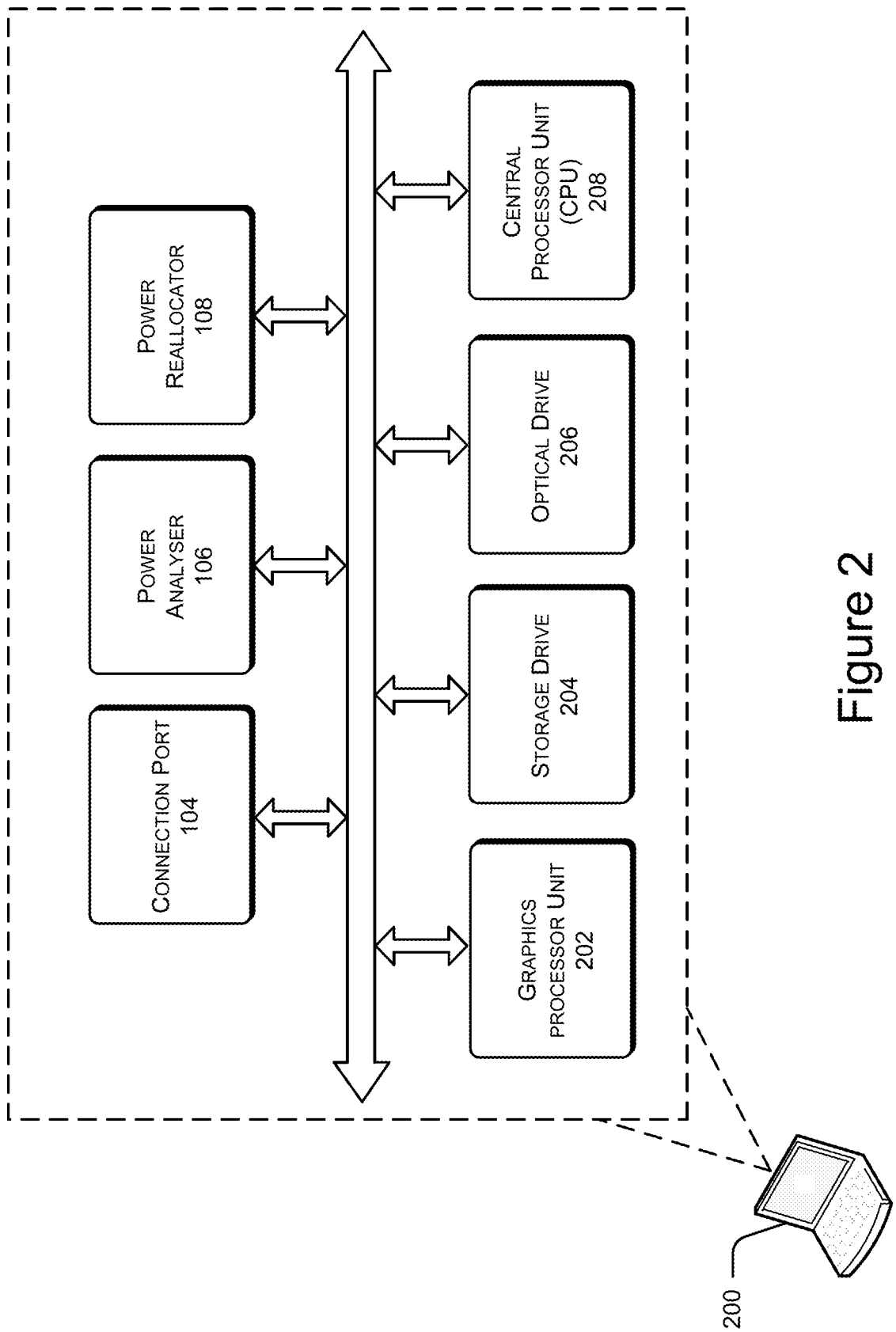
FIG. 2 illustrates a computing system, in accordance with another example of the present subject matter.

FIG. 2 illustrates a computing system 200, in accordance with another example implementation of the present subject matter. The computing system 200 comprises the power analyser 106 and the power reallocator 108. The computing system 200 further includes multiple electronic components such as, the connection port 104, a graphics processor unit (GPU) 202, a storage drive 204, an optical drive 206, and a central processor unit (CPU) 208.

Examples of connection port 104 may include, but not limited to, USB Type-A port, USB Type-B port, USB Type-C port, mini-USB port, and micro-USB port. Further, examples of GPU 202 may include, but not limited to, an integrated GPU, a GPU connected via a Peripheral Component Interconnect (PCI) slot, a GPU connected via a Peripheral Component Interconnect (PCI) express slot, and a GPU connected via an accelerated graphics port (AGP).

Furthermore, examples of storage drive 204 may include, but not limited to, volatile memory (e.g., RAM), and/or non-volatile memory (e.g., EPROM, flash memory, etc.). Moreover, examples of optical drive 206 may include, but not limited to, compact disk read-only memory (CD-ROM), digital versatile disk read-only memory (DVD-ROM), digital versatile disk random access memory (DVD-RAM), write-once read-many (WORM) cartridges, erasable optical cartridges, and Removable Mass Storage (RMS) media which are removable disk (RDX) and flash drives. Also, examples of CPU 208 may include, but not limited to, digital signal processor (DSP) hardware, network processor, application specific integrated circuit (ASIC), and field programmable gate array (FPGA).

Further, the power analyser 106, the power reallocator 108, and the electronic components are coupled to each other. The power analyser 106, the power reallocator 108, and the electronic components may be coupled to each other via a system bus of the computing system 200. The system bus may include a control bus, an address bus, and a data bus of the computing system 200.

In an example, the power analyser 106 and the power reallocator 108 may reside in a memory (not shown) of the computing system 200. In another example, the power analyser 106 and the power reallocator 108 may be implemented as separate hardware capable of performing different functionalities of the computing system 100. The power analyser 106 and the power reallocator 108 may include routines, programs, objects, components, data structures, and the like, which perform particular tasks or implement particular abstract data types. Further, the power analyser 106 and the power reallocator 108 may further include electronic circuitry or a combination of electronic circuitry and control programs that operate the components according to the functions described herein.

In operation, the power analyser 106 may analyse an operational state of an electronic component out of the plurality of electronic components. The operational state of the plurality of electronic component may be analysed at multiple instances. For instance, the operational state may be determined during the bootup of the computing system 200. In another instance, the operational state may be determined when the computing system 200 has booted up and features of an operating system of the computing system 200 have been loaded. That is, the operating state of the electronic components may be determined during real time usage of the computing system 200.

The power analyser 106 may determine the operational state of the electronic components in a number of ways. In an example, to identify the operational state of the electronic components that are connected to the computing system 200, for example, via a peripheral component interconnect (PCI) slot (not shown), the power analyser 106 may determine if the electronic component is available at the PCI slot of the computing system 200. Based on the presence of the electronic component at the PCI slot, the power analyser 106 may determine the operational state to be one of idle and active. That is, if the electronic component is available at the PCI port, the power analyser 106 may determine the operational state of the electronic component to be idle. On the other hand, if electronic component is not available at the PCI port, the power analyser 106 may determine the operational state of the electronic component to be active.

In another example, to identify the operational state of the electronic component which is integrally formed with the computing system 200, the power analyser 106 may determine the operational state based on a configuration in which the electronic component is being operated. For instance, the power analyser 106 may identify a GPU to be operating in a low-power mode.

Based on the operational state of the electronic component, the power analyser 106 may identify an unused power available with the electronic component. In an example, the unused power available with the electronic component may vary based on the operating state of the electronic component. For instance, when the operational state is determined to be idle, the unused power available with the electronic component may be identified as a default power allocated to the electronic component for operation. On the other hand, when the operational state is determined to be active, a difference between the default power allocated to the electronic component and the power consumed by the electronic component in operation may be determined to be the unused power available with the electronic component.

Further, for electronic components working in different power modes, the power analyser 106 may determine the unused power available with the electronic components as a difference between the default power allocated to the electronic component and the power consumed by the electronic component in a specific power mode.

Subsequently, the power reallocator 108 may reallocate a part of the unused power, or unused power available with the electronic components to the connection port 104. The reallocation of the unused power may increase a default power level associated with the connection port 104. As a result, the total power being delivered to a device connected to the computing system 200 via the connection port 104 may be increased.

In another example, the operational state of the storage drive 204 may be determined. The operational state may be determined during bootup of the computing system 200. In operation, the power analyser 106 may run a Power-On Self-Test (POST) to determine if the various electronic components are connected and are operational. In the example, the power analyser 106 may identify the storage drive 204 to be in a non-connected state. Based on the determination, the power analyser 106 may identify the storage drive 204 to be in the idle state and may determine the default power allocated to the storage drive 204 to be the unused power available with the storage drive 204. The power allocator may then reallocate a part of the unused power available with the storage drive 204 to the connection port 104.

In another example, the operational state of the GPU 202 may be analysed when the computing system 200 has booted up. Based on the analysis of the operational state, the GPU 202 may be found to be in active state. The analysis may further reveal that the GPU 202 is operating in a low performance mode, i.e., the computing system 200 is not running any graphic intensive applications. In this situation, the power analyser 106 may determine the default power allocated to the GPU 202 and the power being used by the GPU 202 in operation. In the example, the default power may be identified to be 150 watts and the power being used by the GPU 202 may be identified as 130 watts. The power reallocator 108 may therefore identify the unused power available with the GPU 202 to be 20 watts. The power allocator may then reallocate a part of the unused power available with the GPU 202 to the connection port 104. This, in turn, may increase a power output across the connection port 104.

In a similar illustrative example, the operational state of the CPU 208 may be analysed when the computing system 200 is in operation. Based on the analysis of the operational state, the CPU 208 may be found to be in active state. The analysis may further reveal that the CPU 208 is operating in a low performance mode, i.e., the computing system 200 is not running any processor intensive applications. In this situation, the power analyser 106 may determine the default power allocated to the CPU 208 and the power being used by the CPU 208 in operation. In the example, the default power may be identified to be 95 watts and the power being used by the CPU 208 may be identified as 70 watts. The power reallocator 108 may therefore identify the unused power available with the GPU 202 to be 25 watts. The power allocator may then reallocate a part of the unused power available with the CPU 208 to the connection port 104.

In yet another example, the operational state of the optical drives 206 may be analysed when the computing system 200 has booted up. Based on the analysis of the operational state, the optical drive 206 may be found to be in idle state. In this situation, the power analyser 106 may determine the default power allocated to the optical drive 206 to be the unused power available with the optical drive 206. In the example, the default power may be identified to be 25 watts. The power reallocator 108 may therefore identify the unused power available with the optical drive 206 to be 25 watts and reallocate the unused power to the connection port 104.

In an example, the power reallocator 108 may reallocate the power to the connection port 104 within a power budget of the computing system 200. The power budget is a total power available with multiple electronic components of the computing system 200. In this manner, the power reallocator 108 ensures that the power level across the connection port 104 is increased without fetching any additional power from an external power supply (not shown).

The connection port 104 may further have a threshold power level associated with it. As described earlier, the threshold power level is a maximum configured power for the connection port 104. Further, in an example, the threshold power level may be configured as a thermal design power (TDP) of the computing system, where the TDP is a maximum heat generated by an electronic component that can be dissipated by the computing system. In an example, the reallocation of the unused power from the electronic components to the connection port 104 may increase the default power level associated with the connection port 104 up to the threshold power level. In an example, a connection port, such as connection port 104, having a default power level of 5 watts may deliver a maximum power of 7 watts to a connected device under excess load. In this case, the maximum deliverable power level, i.e., 7 watts, may be the threshold power level associated with the connection port.

In an example, before reallocating the unused power to the connection port 104, the power reallocator 108 may also identify a power handling capability of a device connected to the connection port 104. That is, the power reallocator 108 reallocates the unused power to the connection port 104 if the device connected to the connection port 104 is identified to be compatible with increased power levels. As a result, if a device that has non-compatibility to increased power levels is connected to the connection port 104, the power reallocator 108 keeps the default power level constant and therefore, ensures the safety of the device.

In an example of the present subject matter, before the reallocation of the unused power to the connection port 104, the power reallocator may also increase the threshold power level associated with the connection port 104 to a first threshold power level. That is, the power reallocator may increase the maximum power handling capability of the connection port 104. As a result, on reallocation of the unused power from the electronic components, the default power level associated with the connection port 104 may be increased up to the increased threshold power level, that is, the first threshold power level associated with the connection port 104. Referring to the aforementioned illustrative example, the threshold power level associated with the connection port 104 may be increased from 7 watts to 10 watts, such that, the default power level associated with the connection port 104, under excess load, may also increase to 10 watts.

Further, the power reallocator 108 may increase the threshold power level associated with the connection port 104 in a way, such that, the threshold power level is less than a tolerance power associated with the connection port 104, where the tolerance power is a maximum power tolerable by the connection port 104. As a result, safety in operation of the connection port 104 may also be ensured.

Figure 3:
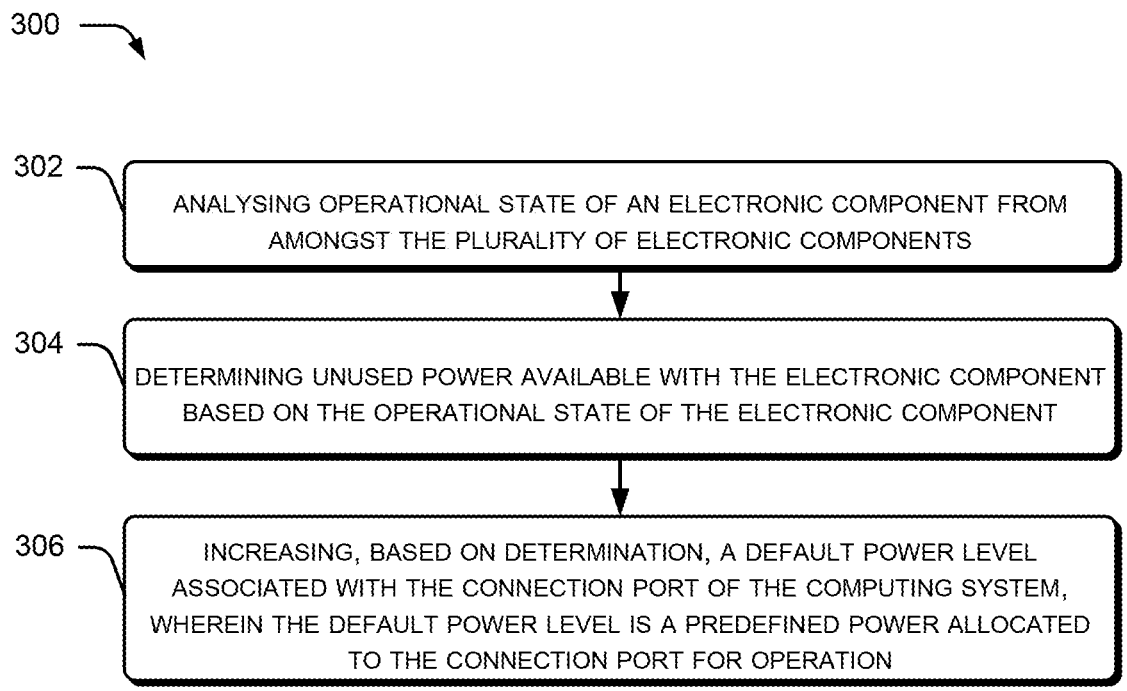
FIG. 3 illustrates a method for reallocating power between a plurality of electronic components and a connection port of a computing system, in accordance with another example of the present subject matter.

FIG. 3 illustrates a method 300 for reallocating power between an electronic component 102 and a connection port 104 of a computing system 100, in accordance with an example implementation of the present subject matter. Although the method 300 may be implemented in a variety of computing systems, but for the ease of explanation, the description of the method 300 is provided in reference to the above-described computing system 100. The order in which the methods 300 is described is not intended to be construed as a limitation, and any number of the described method blocks may be combined in any order to implement the method 300, or an alternative method.

It may be understood that blocks of the method 300 may be performed in the computing system 100. The blocks of the method 300 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

At block 302, an operational state of an electronic component 102 from amongst multiple electronic components is analysed. In an example, a power analyser 106 of the computing system 100 may analyse the operational state of the electronic component 102. The operational state of the electronic component 102 may be analysed at multiple instances. In an example, the operational state of the electronic component is analysed at the time of bootup of the computing system 100. In another example, the operational state of the electronic component 102 is analysed when an operating system of the computing system 100 has finished booting.

At block 304, unused power available with the electronic component 102 is determined. In an example, the power analyser 106 may determine the unused power available with the electronic component 102. Further, the unused power may be determined based on the operational state of the electronic component 102. In an example, if the operational state of the electronic component 102 is found to be idle, the unused power is a default power available with the electronic component 102 for operation, where the default power is a predefined power allocated to the connection port for operation. On the other hand, if the operational state of the electronic component 102 is found to be active, the unused power available with the electronic component 102 is identified to be difference between the default power allocated to the electronic component 102 and the power consumed by the electronic component 102.

At block 306, based on the determination of the unused power available with the electronic component 102, the default power level associated with the connection port 104 is increased. An increase in default power level increases a magnitude of current that is deliverable via the connection port 104. As a result, charging speed of a device being charged by the connection port 104 is increased.

Figure 4:
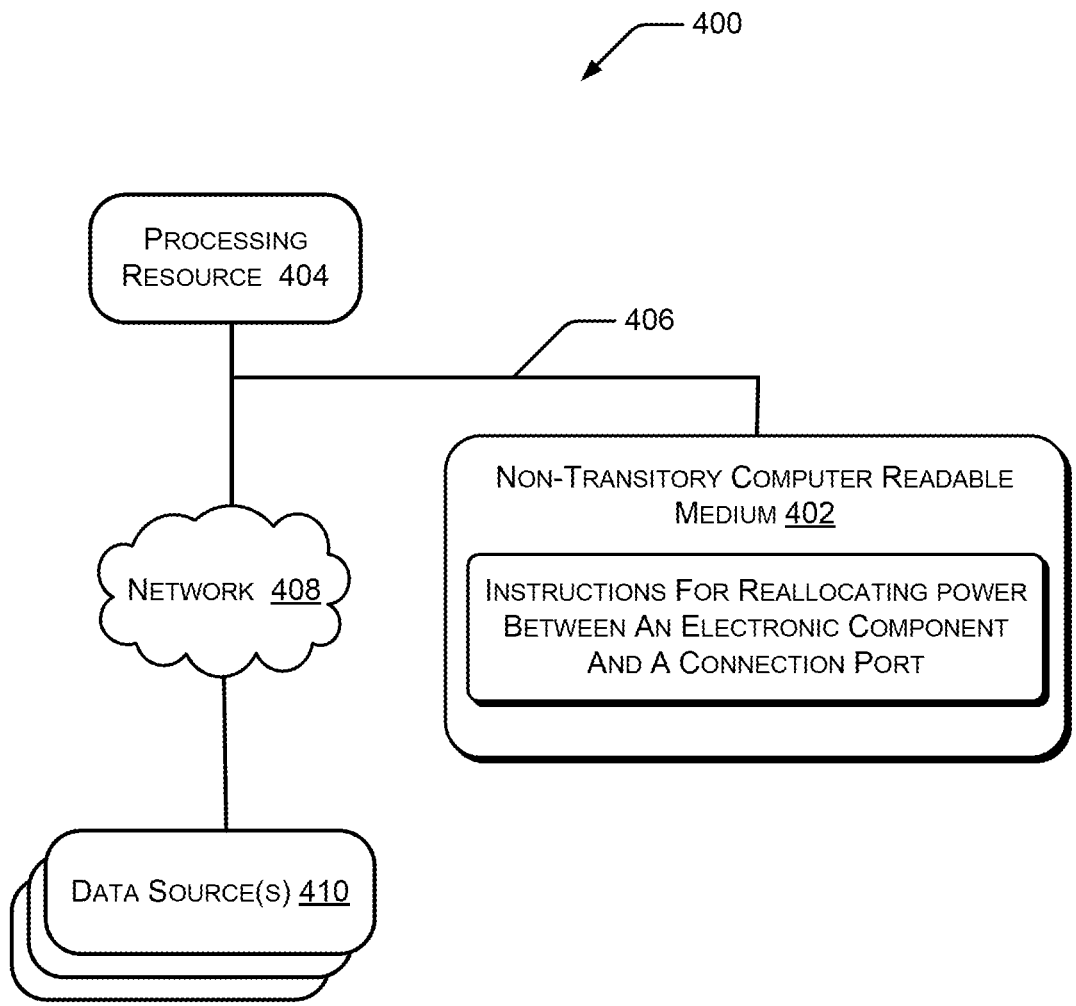
FIG. 4 illustrates a computing environment for reallocating power between a plurality of electronic components and a USB port of a computing system, in accordance with another example of the present subject matter.

FIG. 4 illustrates a system environment 400 implementing a non-transitory computer-readable medium 402 for reallocating power between an electronic component and a Universal Serial Bus (USB) port, according to an example of the present subject matter. In an example implementation, the system environment 400 may be a computing system, such as the computing system 200. The system environment 400 includes a processing resource 404 communicatively coupled to the non-transitory computer-readable medium 402 through a communication link 406. In an example, the processing resource 404 fetches and executes computer-readable instructions from the non-transitory computer-readable medium 402.

The non-transitory computer-readable medium 402 can be, for example, an internal memory device or an external memory device. In an example implementation, the communication link 406 may be a direct communication link, such as any memory read/write interface. In another example implementation, the communication link 406 may be an indirect communication link, such as a network interface. In such a case, the processing resource 404 can access the non-transitory computer-readable medium 402 through a network 408. The network 408 may be a single network or a combination of multiple networks and may use a variety of different communication protocols.

The processing resource 404 and the non-transitory computer-readable medium 402 may also be communicatively coupled to data source(s) 410. The data source(s) 410 may be used to store data, such as power budget data, details of the power available with various electronic devices, in an example. In an example implementation, the non-transitory computer-readable medium 402 includes a set of computer-readable instructions for reallocating power from the electronic component to the USB port of the computing system 200. The set of computer-readable instructions can be accessed by the processing resource 404 through the communication link 406 and subsequently executed to authorize the access to the computing system 200.

In an example, the non-transitory computer-readable medium 402 may include a set of instructions implementing a power analyser 106. The instructions implementing the power analyser 106 may, in one example, be a code executable to analyse the unused power available with the electronic component. The non-transitory computer-readable medium 402 may further include a set of instructions implementing a power reallocator 108. The instructions implementing the power reallocator may, in one example, be a code executable to reallocate the unused power to the USB port.

In an example, the non-transitory computer-readable medium 402 may include a set of instructions that may be executable by the by the processing resource 404 to analyse operational state of an electronic component from amongst the multiple electronic components. In an example, the operational state of the electronic component may be analysed during the bootup of the computing system.

Based on the operational state of the connection component, the instructions implementing the power analyser 106, in an example, may analyse the unused power available with the electronic component.

Further, the instructions implementing the power reallocator 108, in an example, may increase a threshold power level associated with a connection port of the computing system 200 to a first threshold power level, where the threshold power level is a maximum deliverable power configured for the USB port of the computing system 200.

After the threshold power level is increased, the instructions implementing the power reallocator 108, in an example, may reallocate the unused power available with the electronic component to the USB port. The reallocation of the unused power increases a default power level associated with the USB port, where the default power level is a predefined power allocated to the USB port for operation. The reallocation of the unused power to the USB port may allow the default power level to be increased up to the first threshold power level.

Although implementations of the present subject matter have been described in language specific to methods and/or structural features, it is to be understood that the present subject matter is not limited to the specific methods or features described. Rather, the methods and specific features are disclosed and explained as example implementations of the present subject matter.

We claim:

1. A method for reallocating power between a plurality of electronic components and a connection port of a computing system, the method comprising:
    analysing an operational state of an electronic component from amongst the plurality of electronic components of the computing system, wherein the operational state of the electronic component is determined during bootup of the computing system;
    determining unused power available to the electronic component based on the operational state of the electronic component, the unused power being a difference in a power allocated to the electronic component and a power consumed by the electronic component during operation; and
    increasing, based on the determination, a default power level associated with the connection port, wherein the default power level is a predefined power allocated to the connection port for operation.

2. The method as claimed in claim 1 further comprising booting the computing system with an increased power level across the connection port.

3. The method as claimed in claim 1, wherein increasing the default power level associated with the connection port comprises increasing the default power level up to a threshold power level associated with the connection port, wherein the threshold power level is a maximum configured power for the connection port.

4. The method as claimed in claim 3 further comprising:
    increasing the threshold power level associated with the connection port to a first threshold power level; and
    increasing the default power level associated with the connection port up to the first threshold power level.

5. The method as claimed in claim 1, wherein the operational state of the electronic component is idle, and wherein increasing the default power level associated with the connection port comprises reallocating a default power allocated to the electronic component to the connection port.

6. The method as claimed in claim 1, wherein the operational state of the electronic component is active, and wherein increasing the default power level associated with the connection port comprises reallocating the unused power available to the electronic component to the connection port, wherein the unused power is a difference between a default power allocated to the electronic component and a power consumed by the electronic component during operation.

7. A computing system comprising:
    a plurality of electronic components;
    a connection port coupled to the plurality of electronic components;
    a memory storing computer-implemented instructions; and
    a processor in communication with the memory that executes the computer-implemented instructions to:
        determine, during bootup of the computing system, unused power available to an electronic component from amongst the plurality of electronic components, wherein the unused power is a difference between a power allocated to the electronic component and a power consumed by the electronic component during operation; and
        reallocate the unused power available to the electronic component to the connection port, wherein reallocating the unused power increases a default power level associated with the connection port.

8. The computing system as claimed in claim 7, wherein the plurality of electronic components comprises at least one of a storage drive, optical drive, and processor.

9. The computing system as claimed in claim 7, wherein the connection port is a Universal Serial Bus (USB) port.

10. The computing system as claimed in claim 7, wherein to reallocate the unused power to the connection port, the processor executes the computer-implemented instructions to reallocate the unused power within a power budget, wherein the power budget is a total power available to the plurality of electronic components.

11. The computing system as claimed in claim 7, wherein to reallocate the unused power to the connection port, the processor executes the computer-implemented instructions to identify a power handling capability of a device connected via the connection port.

12. A non-transitory computer-readable medium comprising instructions executable by a processor to:
    analyse, during bootup of a computing system, an operational state of an electronic component from amongst a plurality of electronic components of the computing system;
    determine unused power available to the electronic component based on the operational state of the electronic component, the unused power being a difference between a power allocated to the electronic component and a power used by the electronic component during operation;
    increase a threshold power level associated with a USB port of the computing system to a first threshold power level, wherein the first threshold power level is a maximum deliverable power configurable for the USB port; and reallocate the unused power available to the electronic component to the USB port, wherein reallocation of the unused power increases a default power level associated with the USB port, wherein the default power level is a predefined power allocated to the USB port for operation.

13. The non-transitory computer-readable medium as claimed in claim 12, wherein increasing the default power level associated with the USB port comprises increasing the default power level up to the first threshold power level.

\* \* \* \* \*